United States Patent
Philip et al.

(10) Patent No.: US 12,452,271 B2
(45) Date of Patent: Oct. 21, 2025

(54) SYSTEM AND METHOD FOR IDENTIFICATION AND ANALYSIS OF SUSPICIOUS DATA IN AN ELECTRONIC NETWORK ENVIRONMENT

(71) Applicant: BANK OF AMERICA CORPORATION, Charlotte, NC (US)

(72) Inventors: Charles Philip, Maharashtra (IN); Tanmay Devangnbhai Shelat, Gujarat (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 317 days.

(21) Appl. No.: 18/102,145

(22) Filed: Jan. 27, 2023

(65) Prior Publication Data
US 2024/0259407 A1    Aug. 1, 2024

(51) Int. Cl.
*H04L 9/00* (2022.01)
*H04L 9/40* (2022.01)

(52) U.S. Cl.
CPC .............................. *H04L 63/1425* (2013.01)

(58) Field of Classification Search
CPC ........... G06F 21/60; G06F 21/50; H04L 63/14
USPC ......................................................... 726/23
See application file for complete search history.

(56) References Cited

U.S. PATENT DOCUMENTS

| | | | |
|---|---|---|---|
| 7,093,292 B1 | 8/2006 | Pantuso | |
| 7,159,237 B2 | 1/2007 | Schneier | |
| 7,686,214 B1 | 3/2010 | Shao | |
| 7,716,737 B2 | 5/2010 | Wilken | |
| 7,774,839 B2 | 8/2010 | Nazzal | |
| 7,979,889 B2 | 7/2011 | Gladstone | |
| 8,201,257 B1 | 6/2012 | Andres | |
| 8,205,259 B2 | 6/2012 | Stute | |
| 8,504,879 B2 | 8/2013 | Poletto | |
| 8,677,480 B2 | 3/2014 | Yen | |
| 8,779,921 B1 | 7/2014 | Curtiss | |
| 10,769,159 B2 * | 9/2020 | Lyons | G06Q 30/02 |
| 11,411,966 B2 | 8/2022 | Muddu | |
| 2005/0060535 A1 * | 3/2005 | Bartas | H04L 63/02 713/154 |
| 2006/0242694 A1 | 10/2006 | Gold | |

(Continued)

FOREIGN PATENT DOCUMENTS

KR      20050086441      *   8/2005   ......... H04L 63/0263

*Primary Examiner* — Josnel Jeudy
(74) *Attorney, Agent, or Firm* — Moore & Van Allen PLLC; William Walters

(57) ABSTRACT

Systems, computer program products, and methods are described herein for identification and analysis of suspicious data in an electronic network environment. For instance, the system may include a processing device configured to: receive a transmission of an electronic communication through a communication gateway; determining if the electronic communication contains one or more extraneous characteristics; and, in response to determining that the electronic communication contains one or more extraneous characteristics, initiating at least one of a behavioral analysis, a static analysis, or a metadata analysis. The system may further configure the processor to create, in response to initiating at least one of the behavioral analysis, the static analysis, or the metadata analysis, an analytics log associated with the electronic communication.

17 Claims, 9 Drawing Sheets

(56) References Cited

U.S. PATENT DOCUMENTS

| | | | |
|---|---|---|---|
| 2009/0282036 A1* | 11/2009 | Fedtke | G06F 21/6254 |
| | | | 707/E17.135 |
| 2012/0304288 A1 | 11/2012 | Wright | |
| 2014/0165207 A1 | 6/2014 | Engel | |
| 2015/0128263 A1 | 5/2015 | Raugas | |
| 2016/0028762 A1 | 1/2016 | Di Pietro | |
| 2016/0191558 A1* | 6/2016 | Davison | H04L 63/145 |
| | | | 726/1 |
| 2016/0342903 A1 | 11/2016 | Shumpert | |
| 2017/0063905 A1 | 3/2017 | Muddu | |
| 2017/0192872 A1 | 7/2017 | Awad | |
| 2018/0181626 A1* | 6/2018 | Lyons | G06Q 30/0201 |
| 2022/0345469 A1* | 10/2022 | Domagalski | H04L 63/0236 |
| 2023/0095415 A1* | 3/2023 | Boyer | G06F 21/556 |
| | | | 726/23 |

\* cited by examiner

SYSTEM AND METHOD FOR IDENTIFICATION AND ANALYSIS OF SUSPICIOUS DATA IN AN ELECTRONIC NETWORK ENVIRONMENT

TECHNOLOGICAL FIELD

Example embodiments of the present disclosure relate to identification and analysis of suspicious data in an electronic network and, more particularly, to analysis of extraneous characteristics in an electronic communication.

BACKGROUND

Suspicious data in electronic communication can be difficult to detect and prevent in real-time. Applicant has identified a number of deficiencies and problems associated with identification and analysis of suspicious data in an electronic network. Through applied effort, ingenuity, and innovation, many of these identified problems have been solved by developing solutions that are included in embodiments of the present disclosure, many examples of which are described in detail herein

BRIEF SUMMARY

The following presents a simplified summary of one or more embodiments of the present disclosure, in order to provide a basic understanding of such embodiments. This summary is not an extensive overview of all contemplated embodiments and is intended to neither identify key nor critical elements of all embodiments nor delineate the scope of any or all embodiments. Its sole purpose is to present some concepts of one or more embodiments of the present disclosure in a simplified form as a prelude to the more detailed description that is presented later.

Systems, methods, and computer program products are provided for identification and analysis of suspicious data in an electronic network.

In one aspect, a system for identification and analysis of suspicious data in an electronic network environment is provided. The system includes at least one processing device and at least one non-transitory storage device with computer-readable program code stored thereon and accessible by the at least one processing device, wherein the computer-readable code when executed is configured to cause the at least one processing device to receive a transmission of an electronic communication through a communication gateway. The computer-readable code when executed is configured to cause the at least one processing device to determine if the electronic communication contains one or more extraneous characteristics. The computer-readable code when executed is also configured to cause the at least one processing device to, in response to determining that the electronic communication contains one or more extraneous characteristics, initiate at least one of a behavioral analysis, a static analysis, or a metadata analysis. The computer-readable code when executed is further configured to cause the at least one processing device to, in response to initiating at least one of the behavioral analysis, the static analysis, or the metadata analysis, create an analytics log associated with the electronic communication.

In some embodiments, the computer-readable code when executed is further configured to cause the at least one processing device to, in response to determining that the electronic communication contains one or more extraneous characteristics, initiate the metadata analysis of the electronic communication. The computer-readable code when executed is also configured to cause the at least one processing device to cause the results of the metadata analysis to be stored in the analytics log. The computer-readable code when executed is further configured to cause the at least one processing device to cause at least one or more of the extraneous characteristics of the electronic communication to be placed in an isolated environment. The computer-readable code when executed is still further configured to cause the at least one processing device to initiate an execution of the one or more extraneous characteristics in the electronic communication within the isolated environment. The computer-readable code when executed is still further configured to cause the behavioral analysis of the electronic communication. The computer-readable code when executed is still further configured to cause the behavioral analysis to be stored in the analytics log.

In some embodiments, the computer-readable code when executed is further configured to cause the at least one processing device to, in response to the behavioral analysis being stored in the analytics log, cause the isolated environment to be dismantled.

In some embodiments, the computer-readable code when executed is further configured to cause the at least one processing device to perform the metadata analysis, which comprises one or more of detect a potential threat associated with the electronic communication, determine a behavior pattern associated with at least one of a sender or a designated receiver of the electronic communication, track activities associated with at least one of the sender or the designated receiver of the electronic communication, or determine intent associated with the sender or the electronic communication.

In some embodiments, the computer-readable code when executed is further configured to cause the at least one processing device to cause a transmission of the analytics log to a user device.

In some embodiments, the user device comprises a user account associated with a user of the electronic communication.

In some embodiments, the user device is associated with a security entity, and wherein the security entity is associated with an entity where the user maintains the user account.

In some embodiments, the static analysis of the extraneous characteristics comprises following one or more malware detection patterns.

In some embodiments, the static analysis of the extraneous characteristics comprises implementing one or more malware detection tools.

In some embodiments, the computer-readable code when executed is further configured to cause the at least one processing device to cause an application upgrade, where the application upgrade comprises determine an underperforming function, wherein the underperforming function is a function that allows one or more potential threats to pass to an end user; search the analytics log for one or more improvement instances, wherein the one or more improvement instances comprise collected data which improves the functionality of the underperforming function by adjusting one or more parameters of the underperforming function to reduce an amount of potential threats that pass to an end user; and update the one or more improvement instances to the underperforming function.

In some embodiments, the underperforming function is one or more of the behavioral analysis, the static analysis, the metadata analysis, the malware detection pattern, or the malware detection tool.

In some embodiments, the computer-readable code when executed is further configured to cause the at least one processing device to receive a transmission of an outgoing electronic communication, wherein the outgoing electronic communication contains one or more extraneous characteristics. The computer-readable code when executed is also configured to cause the at least one processing device to, in response to the outgoing electronic communication containing extraneous characteristics, determine whether the extraneous characteristics contain one or more pieces of hidden data. The computer-readable code when executed is further still configured to cause the at least one processing device to, in response to the extraneous characteristics containing one or more pieces of hidden data, determine whether the hidden data is in a class of confidential data. The computer-readable code when executed is further still configured to cause the at least one processing device to, in response to the hidden data being within the class of confidential data, block the transmission of the outgoing electronic communication.

In another aspect a computer program product for identification and analysis of suspicious data in an electronic network environment is provided. The computer program product comprising at least one non-transitory computer-readable medium having computer-readable program code portions embodied therein, the computer-readable program code portions comprising an executable portion configured to receive a transmission of an electronic communication through a communication gateway; an executable portion configured to determine if the electronic communication contains one or more extraneous characteristics; an executable portion configured to, in response to determining that the electronic communication contains one or more extraneous characteristics, initiate at least one of a behavioral analysis, a static analysis, or a metadata analysis; and an executable portion configured to, in response to initiating at least one of the behavioral analysis, the static analysis, or the metadata analysis, create an analytics log associated with the electronic communication.

In some embodiments, the computer program product further comprises an executable portion configured to, in response to determining that the electronic communication contains one or more extraneous characteristics: initiate the metadata analysis of the electronic communication; cause the results of the metadata analysis to be stored in the analytics log; cause at least one or more of the extraneous characteristics of the electronic communication to be placed in an isolated environment; initiate an execution of the one or more extraneous characteristics in the electronic communication within the isolated environment; cause the behavioral analysis of the electronic communication; and cause the behavioral analysis to be stored in the analytics log.

In some embodiments, the computer program product further comprises an executable portion configured to, in response to the behavioral analysis being stored in the analytics log, cause the isolated environment to be dismantled.

In some embodiments, the computer program product further comprises an executable portion configured to perform the metadata analysis, which comprises one or more of: detect a potential threat associated with the electronic communication; determine a behavior pattern associated with at least one of a sender or a designated receiver of the electronic communication; track activities associated with at least one of the sender or the designated receiver of the electronic communication; or determine intent associated with the sender or the electronic communication.

In yet another aspect, a computer-implemented method for identification and analysis of suspicious data in an electronic network environment is provided. The computer-implemented method includes receiving a transmission of an electronic communication through a communication gateway; determining if the electronic communication contains one or more extraneous characteristics; in response to determining that the electronic communication contains one or more extraneous characteristics, initiating at least one of a behavioral analysis, a static analysis, or a metadata analysis; and in response to initiating at least one of the behavioral analysis, the static analysis, or the metadata analysis, creating an analytics log associated with the electronic communication.

In some embodiments, the method includes, in response to determining that the electronic communication contains one or more extraneous characteristics: initiating the metadata analysis of the electronic communication; causing the results of the metadata analysis to be stored in the analytics log; causing at least one or more of the extraneous characteristics of the electronic communication to be placed in an isolated environment; initiating an execution of the one or more extraneous characteristics in the electronic communication within the isolated environment; causing the behavioral analysis of the electronic communication; and causing the behavioral analysis to be stored in the analytics log.

In some embodiments, the method includes, in response to the behavioral analysis being stored in the analytics log, causing the isolated environment to be dismantled.

In some embodiments, the method includes performing the metadata analysis, which comprises one or more of: detecting a potential threat associated with the electronic communication; determining a behavior pattern associated with at least one of a sender or a designated receiver of the electronic communication; tracking activities associated with at least one of the sender or the designated receiver of the electronic communication; or determining intent associated with the sender or the electronic communication.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
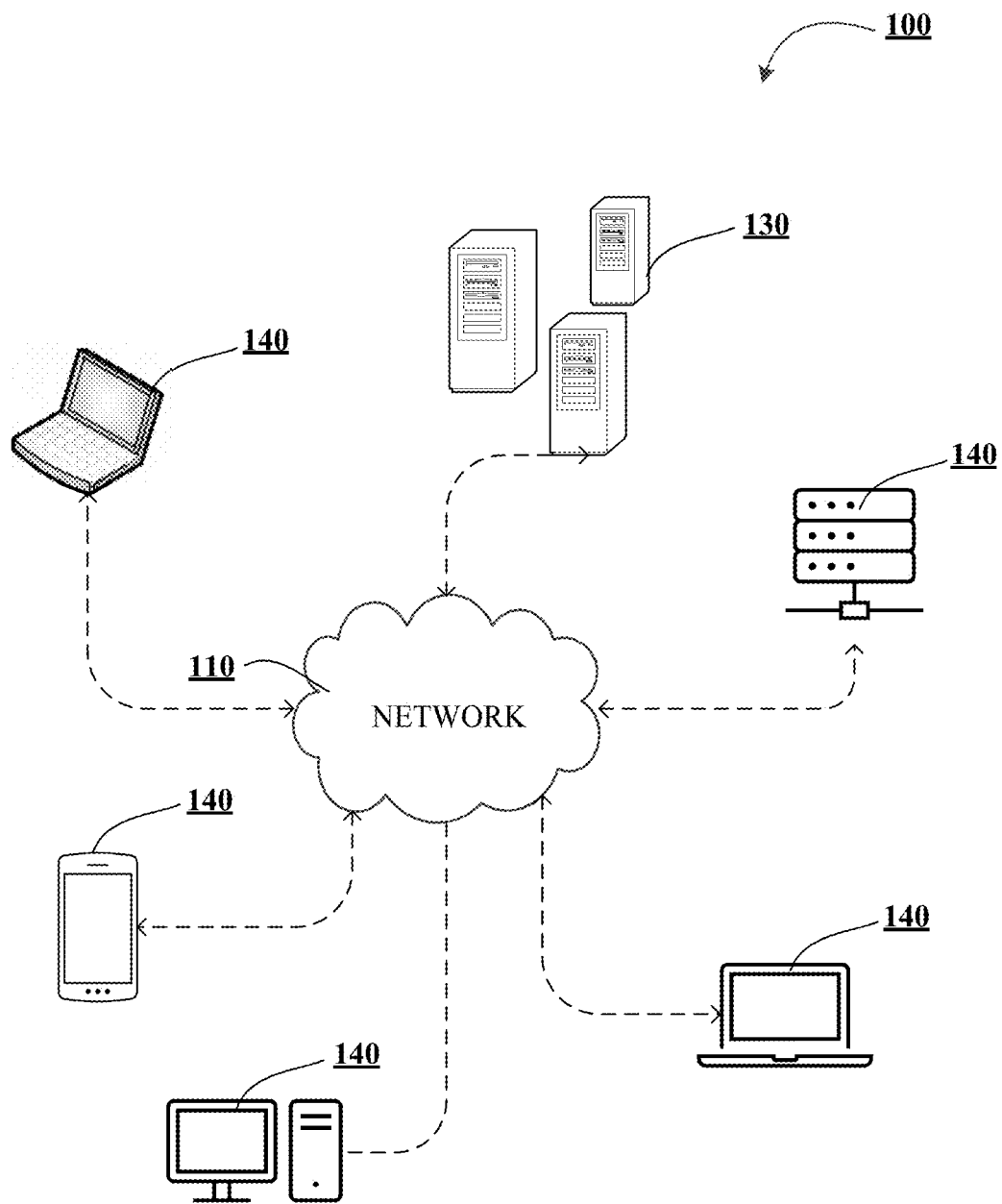
Figure 1B:
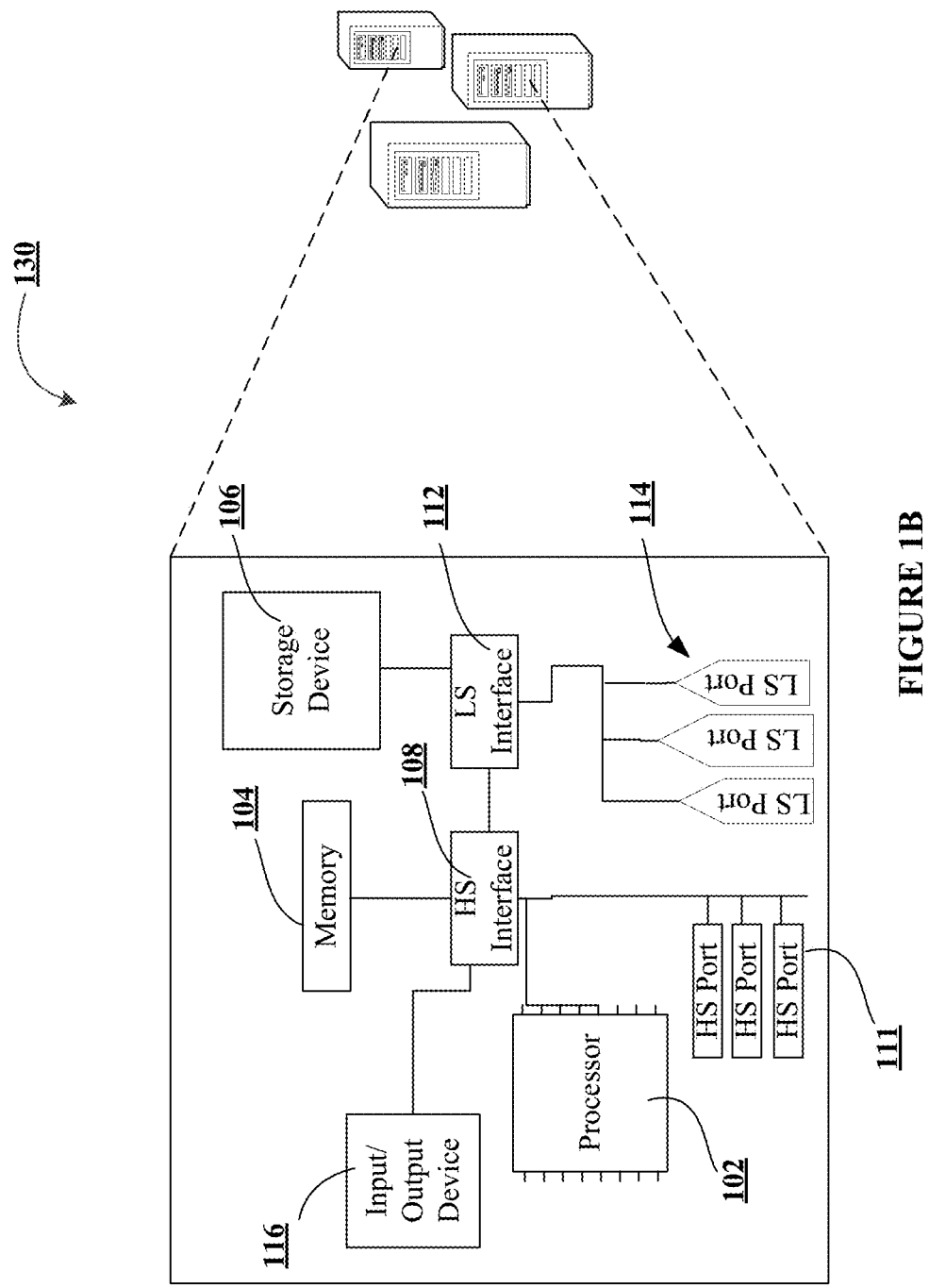
Figure 1C:
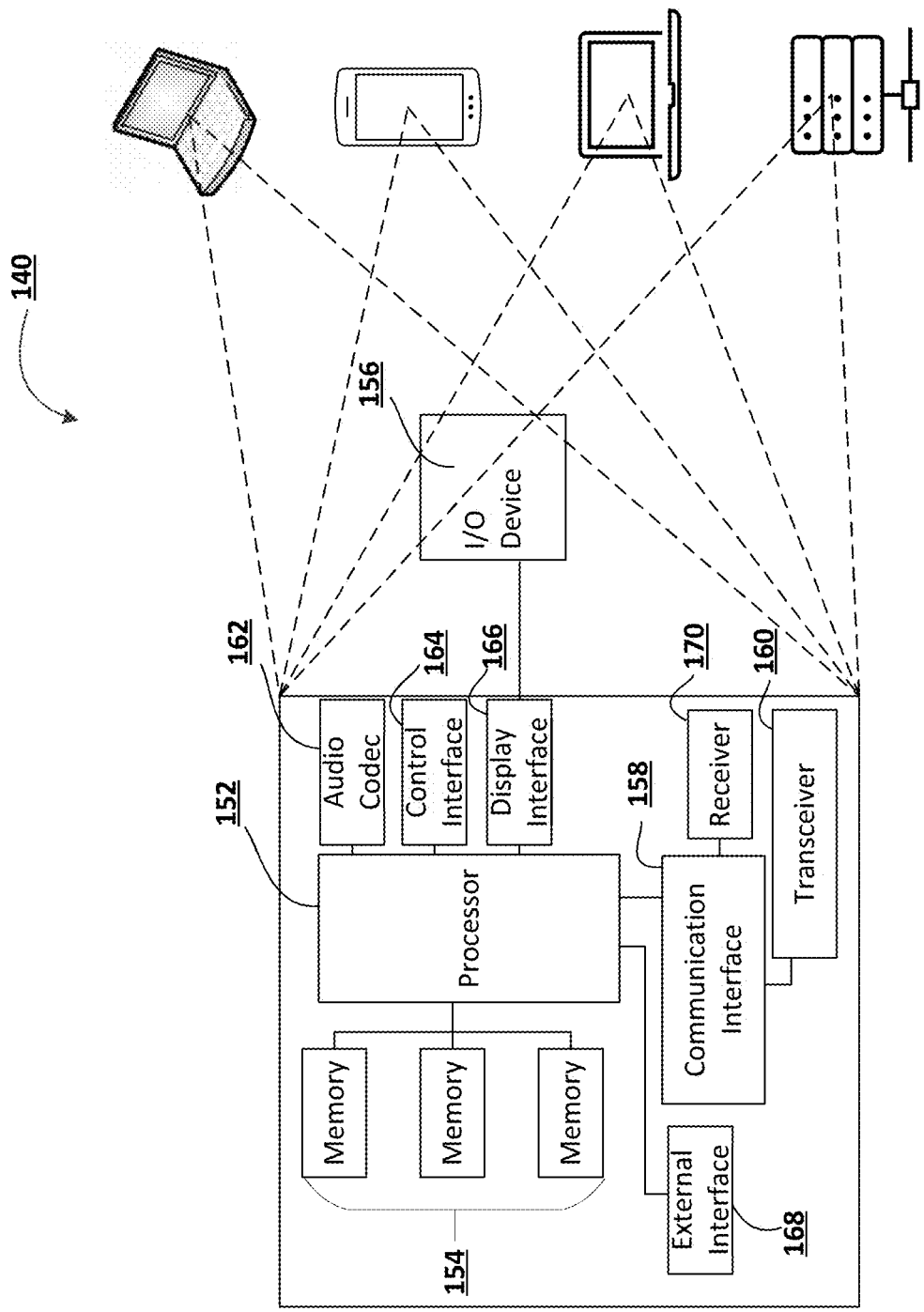

FIGS. 1A-1C illustrates technical components of an exemplary distributed computing environment for identification and analysis of suspicious data in an electronic network, in accordance with an embodiment of the disclosure.

Figure 2:
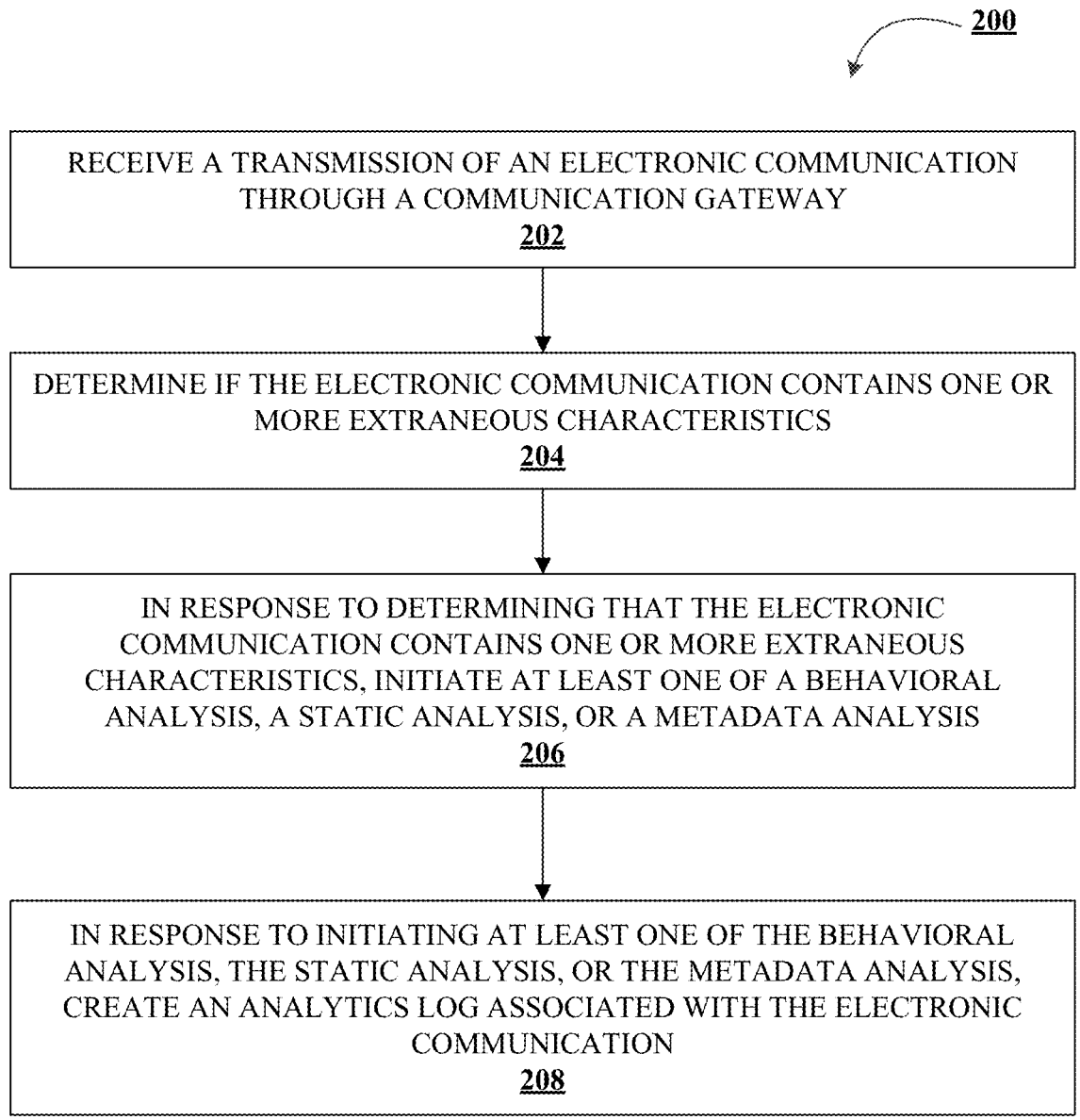

FIG. 2 illustrates a process flow for identification and analysis of suspicious data in an electronic network, in accordance with an embodiment of the disclosure.

Figure 3:
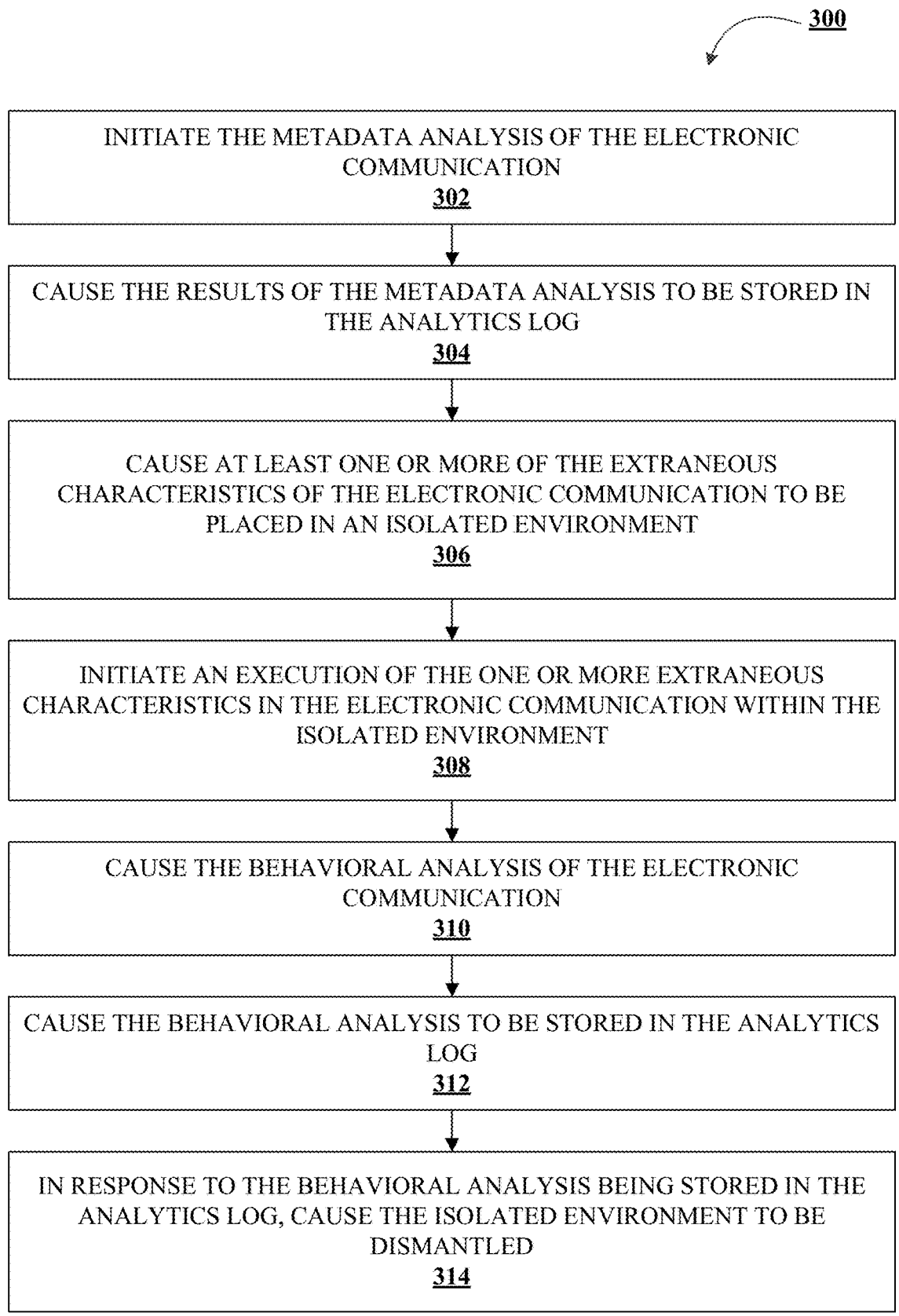

FIG. 3 illustrates a process flow for initiating a metadata analysis and causing the results of the metadata analysis to be stored in an analytics log, and initiating a behavioral analysis and causing the results of the behavioral analysis to be stored in an analytics log.

Figure 4:
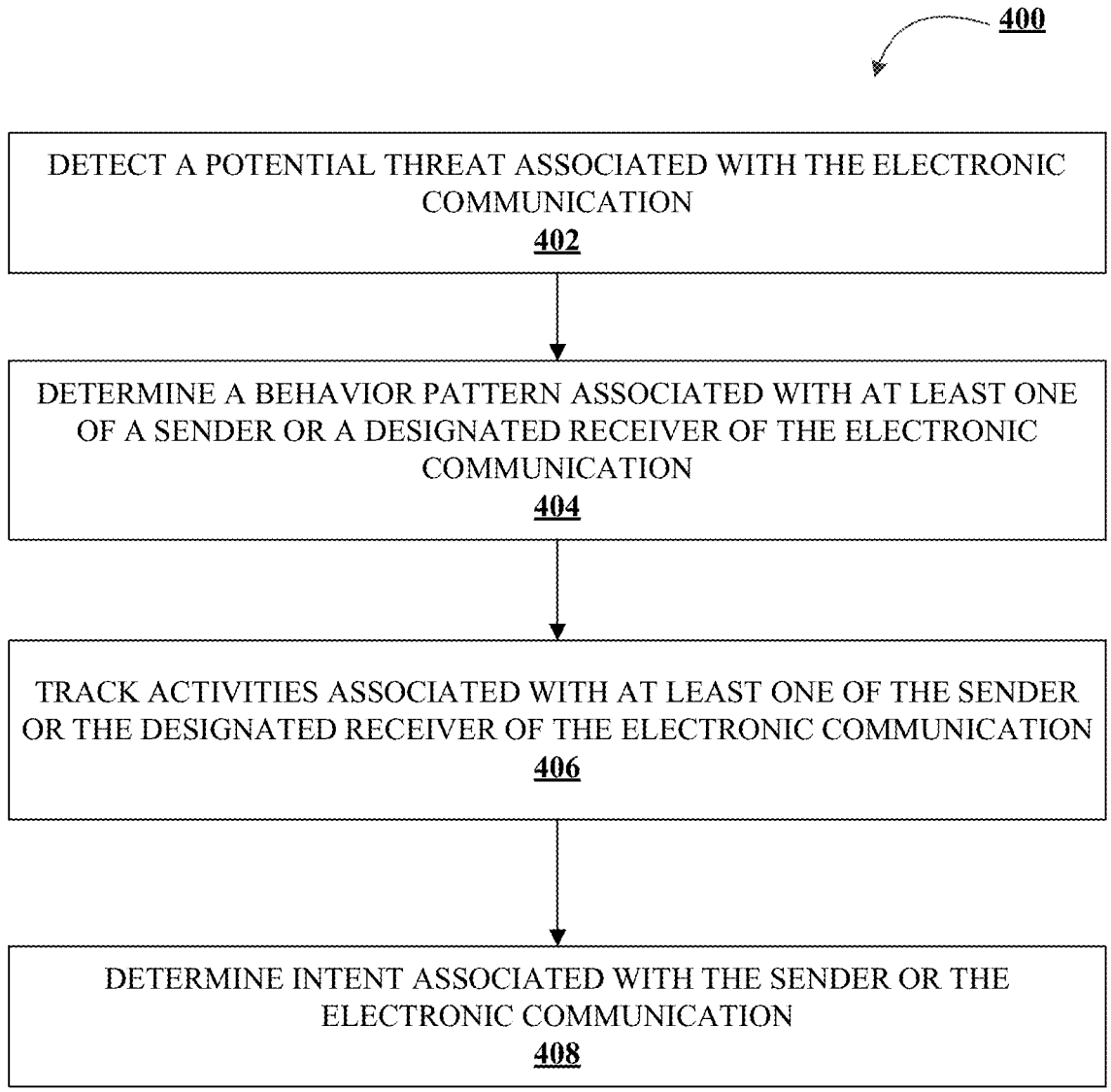

FIG. 4 illustrates determining a behavior pattern associated with at least one of a sender or a designated receiver of an electronic communication.

Figure 5:
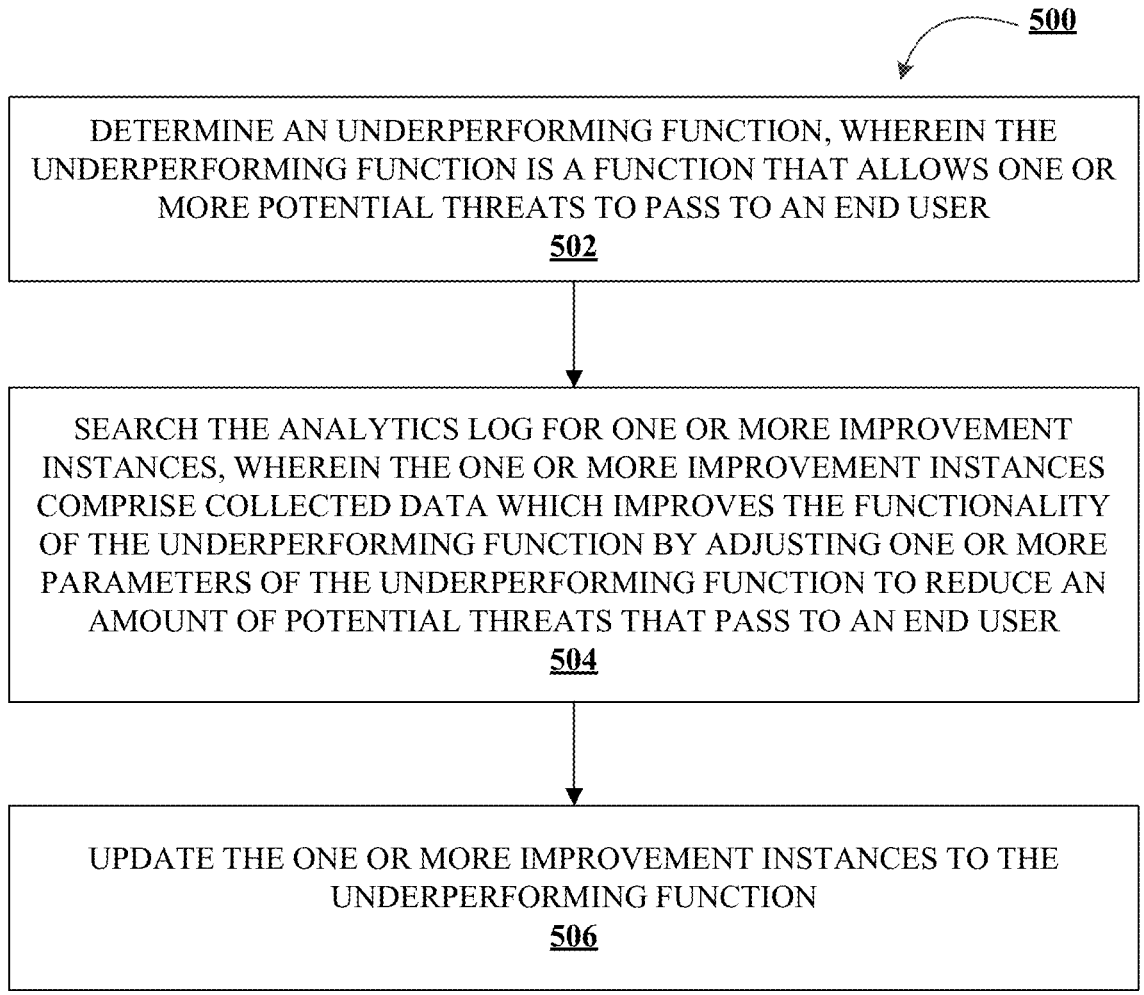

FIG. 5 illustrates updating one or more improvement instances of an underperforming function.

Figure 6:
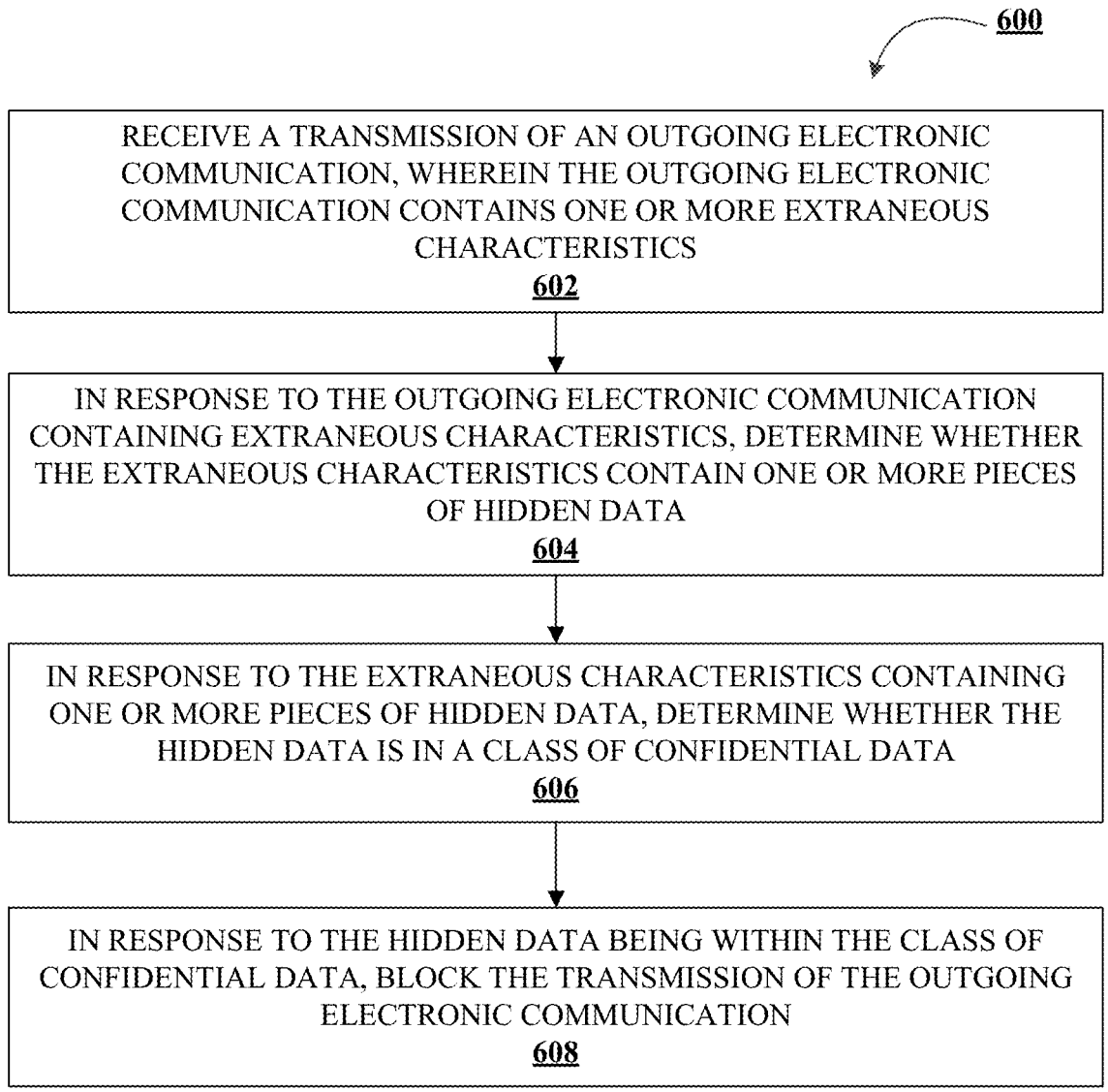

FIG. 6 illustrates, in response to hidden data being within a class of confidential data, blocking a transmission of an outgoing electronic communication.

Figure 7:
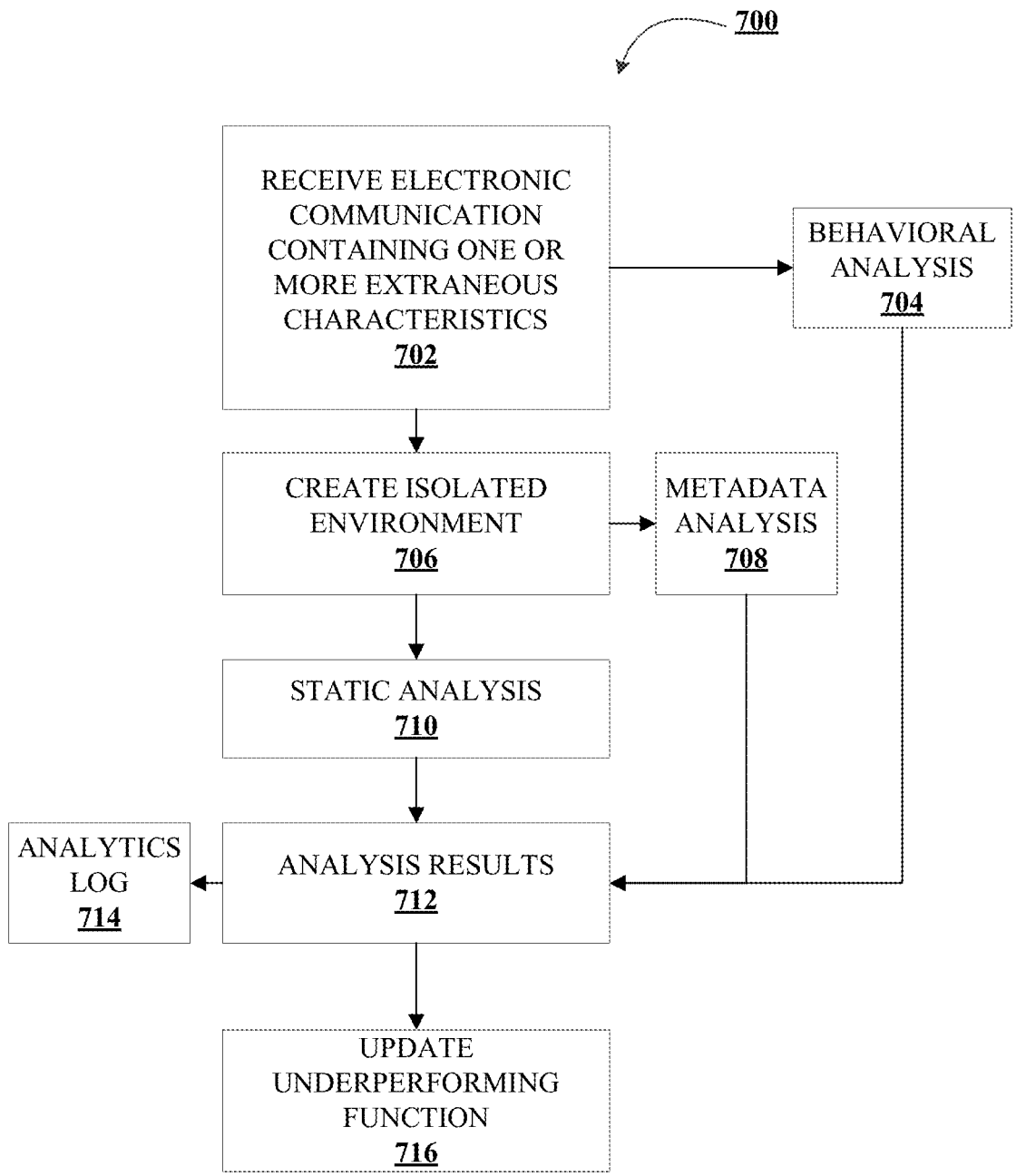

FIG. 7 illustrates a non-limiting example process flow of the suspicious data identification system.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as may be used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository—a storage location where one or more resources are organized, stored and retrieved electronically using a computing device.

As used herein, a "transfer," a "distribution," and/or an "allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

Identification and analysis of suspicious data in an electronic environment is a difficult process with conventional methods. As an entity may operate many confidential and vital applications, it may be important to consider electronic communication (e.g., email) security. Many conventional email gateways simply block emails with executable attachments without performing a thorough analysis on the types of files contained in the email. In some cases, the other file types may contain malicious code or data, malware, a virus, and/or the like, which can execute on a user's system as a logic bomb. Currently, there is no effective tools that exists to effectively analyze email attachments, regardless of the attachment's file type. Further, there is no current solution in place to effectively investigate the source code for hidden malicious code. Further still, there is no current effective solutions to determine any possible data exfiltration attempts, nor any solutions to analyze the behavior of the sender of the electronic communication.

Embodiments of the present disclosure provide for identification and analysis of suspicious data in an electronic network environment. In this regard, and by way of non-limiting example, the suspicious data identification system may receive a transmission of an electronic communication (e.g., email) through a communication gateway (e.g., email gateway). The suspicious data identification system may determine whether the electronic communication contains one or more extraneous characteristics (e.g., file attachments). If the electronic communication does contain one or more extraneous characteristics, the suspicious data identification system may initiate one or more of a behavioral analysis, a static analysis, or a metadata analysis. The extraneous characteristics may be placed in an isolated environment. The suspicious data identification system may then execute the extraneous characteristics within the isolated environment (e.g., execute or open or otherwise review attachments to the email). The behavioral analysis of the electronic communication may subsequently be stored in an analytics log.

Accordingly, the present disclosure for identification and analysis of suspicious data in an electronic network environment works by receiving a transmission of an electronic communication through a communication gateway; determining if the electronic communication contains one or more extraneous characteristics; in response to determining that the electronic communication contains one or more extraneous characteristics, initiate at least one of a behavioral analysis, a statis analysis, or a metadata analysis; and, in response to initiating at least one of the behavioral analysis, the static analysis, or the metadata analysis, create an analytics log associated with the electronic communication. The present disclosure provides a technical solution to a technical problem. As described herein, the technical problem includes accurate and effective determination of suspicious data contained in electronic communications. The technical solution presented herein allows for dynamic, accurate, and secure determination of identification and analysis of suspicious data in an electronic network environment. In particular, identification and analysis of suspicious data in an electronic network environment is an improvement over existing solutions to the accurate and effective determination of suspicious data contained in electronic communications, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing at least some manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment 100 for identification and analysis of suspicious data in an electronic network, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations for implementing the inventive systems and methods for identification and analysis of suspicious data as described herein (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server (e.g., system 130). In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connected to the network 110 could act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, resource distribution devices, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include one or more processors 102, memory 104, storage device 106, a high-speed interface 108 connecting to memory 104, high-speed expansion points 111, and a low-speed interface 112 connecting to a low-speed bus 114, and an input/output (I/O) device 116. The system 130 may also include a high-speed interface 108 connecting to the memory 104, and a low-speed interface 112 connecting to low-speed port 114 and storage device 106. Each of the components 102, 104, 106, 108, 111, and 112 may be operatively coupled to one another using various buses and may be mounted on a common motherboard or in other manners as appropriate. As described herein, the processor 102 may include a number of subsystems to execute the portions of processes (e.g., operations) described herein. Each subsystem may be a self-contained component of a larger system (e.g., system 130) and capable of being configured to execute specialized processes as part of the larger system. In some embodiments, the operations described herein may be performed by one or more processors (e.g., processor(s) 102) acting collectively. In this way, the operations may be performed by one or more systems 130 and each system may have one or more processors that combine to perform the operations. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity. In some embodiments, multiple systems, same or similar to system 130, may collectively be used to perform the various operations disclosed herein.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 may store information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router (e.g., through a network adapter).

The system 130 may be implemented in a number of different forms. For example, the system 130 may be implemented as a standard server, or multiple times in a group of such servers. Additionally, the system 130 may also be implemented as part of a rack server system or a personal computer (e.g., laptop computer, desktop computer, tablet computer, mobile telephone, and/or the like). Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 156, 158, 160, 162, 164, 166, 168 and 170, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156 (e.g., input/output device 156). The display 156 may be, for example, a Thin-Film-Transistor Liquid Crystal Display (TFT LCD) or an Organic Light Emitting Diode (OLED) display, or other appropriate display technology. An interface of the display may include appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a Single In Line Memory Module (SIMM) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, near-field communication (NFC), and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed application specific integrated circuits (ASICs), computer hardware, firmware, software, and/or combinations thereof.

FIG. 2 is a flow chart 200 which illustrates a process flow for identification and analysis of suspicious data in an electronic network, in accordance with an embodiment of the disclosure. The method may be carried out by various components of the distributed computing environment 100 discussed herein (e.g., the system 130, one or more end-point devices 140, etc.). An example system may include at least one processing device and at least one non-transitory storage device with computer-readable program code stored thereon and accessible by the at least one processing device, wherein the computer-readable code when executed is configured to carry out the method discussed herein.

In some embodiments, a suspicious data identification system (e.g., similar to one or more of the systems described herein with respect to FIGS. 1A-1C) may perform one or more of the steps of process flow 200. For example, a suspicious data identification system (e.g., the system 130 described herein with respect to FIGS. 1A-1C) may perform the steps of process flow 200.

As shown in block 202, the process flow 200 of this embodiment includes receiving a transmission of an electronic communication through a communication gateway. In some embodiments, the suspicious data identification system 130 may receive the electronic communication from a network (e.g., network 110 of FIGS. 1A-1C). In some embodiments, the suspicious data identification system 130 may receive the electronic communication from the network through a communication device (e.g., a networking device coupled with the low-speed expansion portion 114 of FIGS. 1A-1C). In some embodiments, the network (e.g., network 110 of FIGS. 1A-1C) may receive the electronic communication from an end-point device (e.g., end-point device(s) 140 of FIGS. 1A-1C). In some embodiments, the suspicious data identification system 130 may store the electronic communication in a storage device (e.g., memory 104 or storage device 106 in FIGS. 1A-1C).

As used herein, "transmission" may encompass a variety of definitions, such as dissemination, correspondence, transfer, distribution, reproduction, and/or the like. For instance, and by way of non-limiting example, the suspicious data identification system 130 may receive a distribution or reproduction of an electronic communication. In some embodiments, the transmission may originate from one or more devices. In some embodiments, the transmission may originate from an internal device.

As used herein, an "internal device" may include a device within the network the suspicious data identification system 130 is associated with. For instance, and by way of non-limiting example, an internal device may refer to an end-point device (e.g., end-point device(s) 140 in FIGS. 1A-1C), a mobile device, a personal computing device, a server, a network of servers, and/or the like. In some embodiments, the transmission may originate from an external device. As used herein, an "external device" may include a device outside the network the suspicious data identification system 130 is associated with. For instance, and by way of non-limiting example, an external device may refer to an external end-point device, an external mobile device, an external personal computing device, an external server, an external network of servers, and/or the like.

As used herein, an "electronic communication" may refer to any communication transmitted through electronic means. For instance, and by way of non-limiting example, an "electronic communication" may refer to an electronic mail ("email"), short messaging service ("SMS"), multimedia messaging service ("MMS"), instant messaging ("IM"), and/or the like.

As used herein, a "communication gateway" may refer to a device, software, server, and/or the like, through which incoming and outgoing electronic communications pass. For instance, and by way of non-limiting example, a "communication gateway" may refer to a secure email gateway ("SEG") which may be an appliance (e.g., device, server, computer, and/or the like) or a virtual appliance (e.g., cloud service, virtual service, and/or the like). In some embodiments, a communication gateway may refer to a communication gateway of an entity (e.g., financial institution, company, business, and/or the like), a communication gateway of an internal department within the entity, a communication gateway of a select group of users within the entity, a communication gateway of an individual user within the entity, and/or the like.

As shown in block 204, the process flow 200 of this embodiment includes determining if the electronic communication contains one or more extraneous characteristics. In some embodiments, the suspicious data identification system 130 may determine if the electronic communication contains one or more extraneous characteristics in a processor (e.g., processor 102 in FIGS. 1A-1C). As used herein, "extraneous characteristics" may refer to any attachment, file, video, picture, executable file, folders, links (e.g., internal links, external links, backlinks, and/or the like), confidential information, and/or the like that is either attached to, embedded in, or otherwise associated with the electronic communication.

In some embodiments, the suspicious data identification system 130 may analyze the electronic communication to determine if any extraneous characteristics are present. In some embodiments, the suspicious data identification system 130 may determine the amount (e.g., number) of extraneous characteristics that are contained in the electronic communication. In some embodiments, the suspicious data identification system 130 may store the number representing the amount of extraneous characteristics that are present in a storage device (e.g., memory 104 or storage device 106 in FIGS. 1A-1C).

As shown in block 206, the process flow 200 of this embodiment includes, in response to determining that the electronic communication contains one or more extraneous characteristics, initiate at least one of a behavioral analysis, a static analysis, or a metadata analysis.

In some embodiments, the behavioral analysis, static analysis, and/or metadata analysis may be initiated by a processor (e.g., processor 102 in FIGS. 1A-1C). In some embodiments, the behavioral analysis may include a user and entity behavior analysis. In some embodiments, the behavioral analysis may include insider threat detection. In some embodiments, the insider threat detection may include detecting whether users present a threat in response to the behaviors of the users. In some embodiments, the insider threat detection may include analyzing behavior of users inside an entity (e.g., financial institution, company, business, and/or the like).

In some embodiments, the behavioral analysis may include determining sender behavior patterns (e.g., identity analysis or the like). In some embodiments, the sender behavior patterns may be stored in a storage device (e.g., memory 104 or storage device 106 in FIGS. 1A-1C). In some embodiments, determining sender behavior patterns may be determined by a processor (e.g., processor 102 in FIGS. 1A-1C). In some embodiments, determining sender behavior patterns may include analyzing previous attempts of a particular sender to send an electronic communication through the suspicious data identification system 130.

In some embodiments, the suspicious data identification system 130 may create a user characteristics log in response to the behavioral analysis. In some embodiments, the user characteristics log may include one or more characteristics associated with the results of the behavioral analysis performed on a user. In some embodiments, the suspicious data identification system 130 may store the user characteristics log in a storage device (e.g., memory 104 or storage device 106 in FIGS. 1A-1C). In some embodiments, the suspicious data identification system 130 may compare an electronic communication sent by a particular user with that particular user's user characteristic log. In some embodiments, the suspicious data identification system 130 may determine that a particular user is behaving as expected in response to that user's user characteristic log.

In some embodiments, the suspicious data identification system 130 may categorize sender behavior patterns. In some embodiments, the suspicious data identification system 130 may create a potential sender threat category of sender behavior patterns. In some embodiments, the suspicious data identification system 130 may determine that a particular sender's behavior falls within the potential sender threat category of sender behavior patterns. In some embodiments, the suspicious data identification system 130 may block transmission from a particular sender that falls within the potential sender threat category of sender behavior patterns.

In some embodiments, the static analysis may include examining a source code of an extraneous characteristic without executing, opening, or running the extraneous characteristic. For instance, and by way of non-limiting example, the suspicious data identification system 130 may perform a static analysis on an attachment (e.g., file attachment in an email) without opening, running, or executing the attachment. In some embodiments, the suspicious data identification system 130 may perform a static analysis on any and all electronic communications containing one or more extraneous characteristics received by the suspicious data identification system 130. In some embodiments, the suspicious data identification system 130 may automatically perform a static analysis on an electronic communication containing the one or more extraneous characteristics. In some embodiments, the suspicious data identification system 130 may be directed to perform a static analysis on an electronic communication containing one or more extraneous characteristics. In some embodiments, the suspicious data identification system 130 may be directed to perform the static analysis by a user (e.g., personnel, employee, technician, manager, and/or the like).

In some embodiments, the static analysis of the extraneous characteristics comprises following one or more malware detection patterns. In some embodiments, the one or more malware detection patterns may include a variety of malware detection pattern applications. In some embodiments, the one or more malware detection patterns may include providing a rule-based approach to create descriptions of malware families. For instance, and by way of non-limiting example, the rule-based approach may be based on textual or binary patterns. In some embodiments, the malware detection pattern may include Yet Another Ridiculous Acronym ("YARA") rules. In some embodiments, the YARA rules may be predetermined by an outside entity. In some embodiments, the YARA rules may be predetermined by the entity that manages the suspicious data identification system 130. In some embodiments, the YARA rules may contain a variety of predetermined malware families (e.g., SUNBURST, Cobalt Strike®, and/or the like).

In some embodiments, the static analysis may include determining if one or more extraneous characteristics in an electronic communication match one or more predetermined set of malware families within the YARA rules. In some embodiments, in response to the one or more extraneous characteristics matching the one or more predetermined set of malware families, the suspicious data identification system 130 may generate an alert interface component. In some embodiments, the suspicious data identification system 130 may generate the alert interface component in a processor (e.g., processor 102 in FIGS. 1A-1C). In some embodiments, the alert interface component may configure a graphical user interface of a third-party user device.

In some embodiments, the suspicious data identification system 130 may transmit the alert interface component to a third-party user device. In some embodiments, the third-party user device may include the device of the intended recipient of the electronic communication. In some embodiments, the third-party user device may include a security entity (e.g., Information Technology team or the like).

In some embodiments, the static analysis of the extraneous characteristics comprises implementing one or more malware detection tools. In some embodiments, the one or more malware detection tools may include a variety of malware detection tool applications. In some embodiments, the one or more malware detection tools may include one or more antivirus products, one or more website and/or domain scanning engines and datasets, and/or one or more file characterization tools and datasets. In some embodiments, the one or more malware detection tools may include VirusTotal®.

In some embodiments, the one or more malware detection tools (e.g., VirusTotal®) may analyze the one or more extraneous characteristics. In some embodiments, the one or more malware detection tools may detect one or more potential threats contained within the one or more extraneous characteristics.

As shown in block 208, the process flow 200 of this embodiment includes, in response to initiating at least one of the behavioral analysis, the static analysis, or the metadata analysis, create an analytics log associated with the electronic communication.

As used herein, an "analytics log" may refer a report, register, record, ledger, and/or the like of any and all data generated by performing an analysis on an electronic communication containing one or more extraneous characteristics (e.g., data generated by performing a static analysis, a behavioral analysis, a metadata analysis, and/or the like). For instance, and by way of non-limiting example, the suspicious data identification system 130 may create an analytics log of the data generated from performing a static analysis on an electronic communication containing one or more extraneous characteristics. As used here, "data" may refer for any output generated from performing any type of analysis on extraneous characteristics. For instance, and by way of non-limiting example, any instance of interference (e.g., malware, malicious code, virus, and/or the like) which may be generated from performing a static analysis on an extraneous characteristic may be recorded in the analytics log. Similarly, and by way of non-limiting example, the suspicious data identification system 130 may record the behavior of a particular extraneous characteristic in the analytics log in response to the data generated from a behavior analysis.

FIG. 3 is a flow chart 300 which illustrates a process flow for initiating a metadata analysis and causing the results of the metadata analysis to be stored in the analytics log, initiating a behavioral analysis and causing the results of the behavioral analysis to be stored in the analytics log. The method may be carried out by various components of the distributed computing environment 100 discussed herein (e.g., the system 130, one or more end-point device(s) 140, etc.). An example system may include at least one processing device and at least one non-transitory storage device with computer-readable program code stored thereon and accessible by the at least one processing device, wherein the computer-readable code when executed is configured to carry out the method discussed herein.

In some embodiments, a suspicious data identification system (e.g., similar to one or more of the systems described herein with respect to FIGS. 1A-1C) may perform one or more of the steps of process flow 300. For example, a suspicious data identification system (e.g., the system 130 described herein with respect to FIGS. 1A-1C) may perform the steps of process flow 300.

As shown in block 302, the process flow 300 of this embodiment includes initiating the metadata analysis of the electronic communication. In some embodiments, the suspicious data identification system 130 may initiate the metadata analysis of the electronic communication in a processor (e.g., processor 102 in FIGS. 1A-1C). In some embodiments, the metadata analysis may include a dynamic analysis of the electronic communication containing one or more extraneous characteristics. In some embodiments, the metadata analysis (e.g., dynamic analysis) may include analysis of an electronic communication containing an extraneous characteristic by opening, running, or executing the extraneous characteristic. In some embodiments, the metadata analysis (e.g., dynamic analysis) may be performed with a device (e.g., server, computer, mobile device, and/or the like), or may be performed with a virtual application (e.g., cloud-based service, virtual processor, and/or the like).

In some embodiments, the metadata analysis may include receiving electronic communication data. As used herein, "electronic communication data" may include data associated with the characteristics of the sender, the characteristics of the designated receiver, the characteristics of the electronic communication, the characteristics of the extraneous characteristics, and/or the like. Further, electronic communication data may include technical data (e.g., schemas, data types, models, and/or the like); operational data (e.g., process outputs, lineage metadata, performance metadata, and/or the like); business data (e.g., data tags, classifications, mapping business relationships, and/or the like); and/or social data (e.g., metadata associated with user-generated content, business user knowledge, and/or the like).

In some embodiments, the characteristics of the sender may include the sender's identity (e.g., name, email address, account information, and/or the like), the location (e.g., geographic location)), the sender's address (e.g., Internet Protocol (IP) address, Media Access Control (MAC) address, and/or the like), any accounts associated with the sender (e.g., accounts associated with other various Internet websites), and/or the like.

In some embodiments, the characteristics of the designated receiver may include the designated receiver's identity (e.g., e.g., name, email address, account information, and/or the like), the location (e.g., geographic location)), the designated receiver's address (e.g., Internet Protocol (IP) address, Media Access Control (MAC) address, and/or the like), any accounts associated with the designated receiver (e.g., accounts associated with other various Internet websites), and/or the like.

In some embodiments, the data associated with the characteristics of the electronic communication may include the sender's information, the designated receiver's information, the date the electronic communication was sent, the time the electronic communication was sent, the subject of the electronic communication, the route (e.g., the path by which the electronic communication was sent from the sender to the designated receiver), and/or the like. Further, data associated with the characteristics of the electronic communication may include the message of the electronic communication itself.

In some embodiments, the data associated with the characteristics of the extraneous characteristics may include the date the extraneous characteristic was created, the time the extraneous characteristic was created, the file type of the extraneous characteristic, location of where the extraneous characteristic was created, history of changes to the extraneous characteristics, and/or the like. Further, the data associated with the characteristics of the extraneous characteristics may include the message of the extraneous characteristic itself.

In some embodiments, the suspicious data identification system 130 may analyze one or more pieces of electronic communication data. In this way, the suspicious data identification system 130 may compare the one or more pieces of electronic communication data with known threats (e.g. malware, malicious code, and/or the like). For instance, and by way of non-limiting example, the suspicious data identification system 130 may compare an extraneous characteristic's file type with a file type of a known threat (e.g., an executable file (.EXE), a ZIP file (.ZIP), a portable document format (.PDF), and/or the like). In response to the extraneous characteristic's file type matching the file type of a known threat, the suspicious data identification system 130 may place the electronic communication containing the extraneous characteristic in an isolated environment, as discussed below.

In another instance, and by way of non-limiting example, the suspicious data identification system 130 may compare the sender of an extraneous characteristic against a sender who is a known threat. In response to the extraneous characteristic being sent from a sender who is a known threat, the suspicious data identification system 130 may place the electronic communication containing the extraneous characteristic in an isolated environment, as discussed below.

In yet another instance, and by way of non-limiting example, the suspicious data identification system 130 may compare where the electronic communication containing an extraneous characteristic was sent from (e.g., the geographic location of the electronic communication's origination) with the geographic location of a known threat (e.g., a country from which communication is banned). In response to the electronic communication originating from the banned country, the suspicious data identification system 130 may place the electronic communication containing the extraneous characteristic in an isolated environment, as discussed below.

As shown in block 304, the process flow 300 of this embodiment includes causing the results of the metadata analysis to be stored in the analytics log. For instance, and by way of non-limiting example, the suspicious data identification system 130 may store the metadata associated with an electronic communication containing an extraneous characteristic in the analytics log. In some embodiments, the metadata analysis stored in the analytics log may include any and all of the above-mentioned types of electronic communication data. For instance, and by way of non-limiting example, the suspicious data identification system 130 may store the file type of the extraneous characteristic in the analytics log. In other instance, and by way of non-limiting example, the suspicious data identification system 130 may store the geographic location of the sender of the electronic communication in the analytics log.

As shown in block 306, the process flow 300 of this embodiment includes causing at least one or more of the extraneous characteristics of the electronic communication to be placed in an isolated environment. In some embodiments, the suspicious data identification system 130 may use a processor (e.g., processor 102 in FIGS. 1A-1C) to place the one or more extraneous characteristics of the electronic communication in an isolated environment.

In some embodiments, the suspicious data identification system 130 may place all the one or more extraneous characteristics received in an isolated environment. For instance, and by way of non-limiting example, the suspicious data identification system 130 may place any received extraneous characteristic, regardless of the metadata associated with the extraneous characteristic, in the isolated environment.

In some embodiments, the suspicious data identification system 130 may place an extraneous characteristic in the isolated environment in response to the extraneous characteristic being associated with a potential threat trigger. As used herein, a "potential threat trigger" may include any metadata (e.g., electronic communication data) that is associated with a known threat. For instance, and by way of non-limiting example, the suspicious data identification system 130 may place an extraneous characteristic in the isolated environment in response to the extraneous characteristic being of a specified file type. In this way, if the potential threat trigger includes file types of the executable format (e.g., .EXE), and the extraneous characteristic is an executable file, then the suspicious data identification system 130 may place the extraneous characteristic in the isolated environment.

As used herein, an "isolated environment" may refer to an environment which is an instance of a production environment isolated (e.g., separated) from the remaining production environment. In some embodiments, an isolated environment may be one or more segmented or detached portions of component(s), application(s), network(s), and/or the like. In this way, the isolated environment may open, run, or execute extraneous characteristics in an isolated manner which will not affect the remaining system environment. In some embodiments, the isolated environment may include physical components separated from the remaining system environment. In some embodiments, the isolated environment may include virtual applications separated from the remaining system environment. In some embodiments, the isolated environment may include a combination of physical components and virtual applications separated from the remaining system environment.

In some embodiments, the isolated environment may replicate the system of the designated receiver of the electronic communication. In this way, the suspicious data identification system 130 may examine the response of the isolated environment during the execution of the extraneous characteristic as if the extraneous characteristic was being executed on the system of the designated receiver. For instance, and by way of non-limiting example, the isolated environment replicating the system of the designated receive of the electronic communication allows the outcome of executing the extraneous characteristic to be the same as the extraneous characteristic being executed on the system of the designated receiver.

In some embodiments, the suspicious data identification system 130 may create an isolated environment in a processor (e.g., processor 102 in FIGS. 1A-1C). In some embodiments, the isolated environment may be created by the suspicious data identification system 130 in response to the suspicious data identification system 130 receiving an electronic communication containing one or more extraneous characteristics. For instance, and by way of non-limiting example, if the electronic communication includes one or more attachments or embedded objects that may contain executable code, the suspicious data identification system 130 may create an isolated environment for each extraneous characteristic. In some embodiments, the isolated environment may be created by the suspicious data identification system 130 in response to a user input.

As used herein, "place" may refer to moving, transferring, relocating, and/or the like. For instance, and by way of non-limiting example, the suspicious data identification system 130 may place (e.g., transfer, relocate, and/or the like) the electronic communication containing one or more extraneous characteristics in the isolated environment. For instance, and by way of non-limiting example, the suspicious data identification system 130 may place the entire electronic communication containing the extraneous characteristics in the isolated environment. In some embodiments, the suspicious data identification system 130 may place the one or more extraneous characteristics in a single isolated environment. In some embodiments, the suspicious data identification system 130 may place each extraneous characteristic in its own isolated environment. For instance, and by way of non-limiting example, the suspicious data identification system 130 may place only one extraneous characteristic in the isolated environment.

In some embodiments, the suspicious data identification system 130 may create the isolated environment with a variety of applications. In some embodiments, the application that creates the isolated environment may be Docker. In some embodiments, the suspicious data identification system 130 may create the isolated environment based on the file type of the one or more extraneous characteristics. For instance, and by way of non-limiting example, the suspicious data identification system 130 may create a first type of isolated environment for an extraneous characteristic that has a first file type. In another instance, and by way of non-limiting example, the suspicious data identification system 130 may create a second type of isolated environment for an extraneous characteristic that has a second file type. In some embodiments, the suspicious data identification system 130 may create an isolated environment regardless of the file type of the extraneous characteristic. For instance, and by way of non-limiting example, the suspicious data identification system 130 may create an isolated environment for an electronic communication that has an extraneous characteristic file type of an executable file and an extraneous characteristic of an image file.

As shown in block 308, the process flow 300 of this embodiment includes initiating an execution of the one or more extraneous characteristics in the electronic communication within the isolated environment. In some embodiments, the suspicious data identification system 130 may initiate the execution of the one or more extraneous characteristics in the electronic communication with a processor (e.g., processor 102 in FIGS. 1A-1C). In some embodiments, the suspicious data identification system 130 may initiate execution of the one or more extraneous characteristics similar to how a user (e.g., recipient of the electronic communication) may initiate execution of the one or more extraneous characteristics.

As shown in block 310, the process flow 300 of this embodiment includes causing the behavioral analysis of the electronic communication. In some embodiments, the suspicious data identification system 130 may cause the behavioral analysis of the electronic communication with a processor (e.g., processor 102 in FIGS. 1A-1C). In some embodiments, the suspicious data identification system 130 may cause the behavioral analysis of the extraneous characteristics contained within the electronic communication. In some embodiments, the behavioral analysis may include determining how the isolated environment responds to the electronic communication containing the one or more extraneous characteristics.

In some embodiments, the behavioral analysis may include analysis of an electronic communication containing an extraneous characteristic by opening, running, or executing the extraneous characteristic. In some embodiments, the suspicious data identification system 130 may examine the response of the isolated environment to the executed extraneous characteristic.

For instance, and by way of non-limiting example, the behavioral analysis may include the response of the isolated environment when an extraneous characteristic containing a logic bomb is executed within the isolated environment. In this way, the suspicious data identification system 130 may examine which systems of the isolated environment are targeted during the logic bomb's execution, and the behavior of the attacked systems. Further, the suspicious data identification system 130 may examine the behavior of the electronic communication, the extraneous characteristic, and/or the like during the logic bomb's execution. Further still, the suspicious data identification system 130 may examine the systems of the isolated environment that are not targeted during the logic bomb's execution.

As shown in block 312, the process flow 300 of this embodiment includes causing the behavioral analysis to be stored in the analytics log. In some embodiments, the results of the behavioral analysis may include the outcome (e.g., result) of the extraneous characteristic upon execution of the extraneous characteristics (e.g., the isolated environment's response to executing an extraneous characteristic). For instance, and by way of non-limiting example, in response to the isolated environment being attacked from an extraneous characteristic containing, for example, a logic bomb, the results of executing the extraneous characteristic would be stored in the analytics log.

In some embodiments, the suspicious data identification system 130 is further configured to cause the at least one processing device to cause a transmission of the analytics log to a user device. In some embodiments, the user device comprises a user account associated with a user of the electronic communication. In some embodiments, the user may include the designated receiver of the electronic communication. As used herein, a "designated receiver" may include a user device, an end-point device (e.g., end-point device(s) 140 in FIGS. 1A-1C), and/or the like that has the ability to receive electronic communications. In some embodiments, the designated receiver of the electronic communication may include the intended recipient of the electronic communication.

In some embodiments, the user may include an entity's Information Technology ("IT") team. In some embodiments, the user may include the manager of the suspicious data identification system 130. In some embodiments, the user device is associated with a security entity, and wherein the security entity is associated with an entity where the user maintains the user account. In some embodiments, the security entity may include an information security team that is responsible for eliminating potential threats to the entity.

As shown in block 314, the process flow 300 of this embodiment includes, in response to the behavioral analysis being stored in the analytics log, causing the isolated environment to be dismantled. In some embodiments, the suspicious data identification system 130 may cause the isolated environment to be dismantled in a processor (e.g., processor 102 in FIGS. 1A-1C). In some embodiments, the isolated environment may be dismantled automatically in response to the behavioral analysis being stored in the analytics log.

In some embodiments, the suspicious data identification system 130 may eliminate (e.g., delete) any data in the isolated environment in response to the data in the isolated environment being stored in the analytics log. In some embodiments, the isolated environment may be dismantled in response to the data in the isolated environment being eliminated.

For instance, and by way of non-limiting example, the suspicious data identification system 130 may receive an electronic communication containing an extraneous characteristic with the file type of an image (e.g., a Joint Photographic Experts Group (.JPEG), a Graphics Interchange Format (.GIF), a Portable Network Graphics (.PNG), and/or the like). In some embodiments, the suspicious data identification system 130 may compare the file type against a known file type threat (e.g., an image file). In response to the extraneous characteristic being an image, the suspicious data identification system 130 may place the electronic communication containing the extraneous characteristic in the isolated environment. In some embodiments, the suspicious data identification system 130 may execute (e.g., open, run, save, and/or the like) the extraneous characteristic. In some embodiments, the suspicious data identification system 130 may cause a metadata analysis, a behavioral analysis, or both of the extraneous characteristic. In some embodiments, the suspicious data identification system 130 may cause the results of the metadata analysis to be stored in the analytics log. In some embodiments, the suspicious data identification system 130 may cause the results of the behavioral analysis of the extraneous characteristic to be stored in the analytics log. In some embodiments, suspicious data identification system 130 may dismantle the isolated environment.

FIG. 4 is a flow chart 400 which illustrates determining a behavior pattern associated with at least one or a sender or a designated receiver of an electronic communication. The method may be carried out by various components of the distributed computing environment 100 discussed herein (e.g., the system 130, one or more end-point devices 140, etc.). An example system may include at least one processing device and at least one non-transitory storage device with computer-readable program code stored thereon and accessible by the at least one processing device, wherein the computer-readable code when executed is configured to carry out the method discussed herein.

In some embodiments, a suspicious data identification system (e.g., similar to one or more of the systems described herein with respect to FIGS. 1A-1C) may perform one or more of the steps of process flow 400. For example, a suspicious data identification system (e.g., the system 130 described herein with respect to FIGS. 1A-1C) may perform the steps of process flow 400.

As shown in block 402, the process flow 400 of this embodiment includes detecting a potential threat associated with the electronic communication. In some embodiments, the suspicious data identification system 130 may detect a potential threat in a processor (e.g., processor 102 in FIGS. 1A-1C). As used herein, a "potential threat" may include malicious code, malware, virus, ransomware, and/or the like. In some embodiments, the potential threat may be contained in one or more extraneous characteristics contained in the electronic communication. In some embodiments, the potential threat may be contained in the electronic communication itself.

In some embodiments, the suspicious data identification system 130 may detect a potential threat associated with the electronic communication by analyzing the analytics log associated with the electronic communication. In some embodiments, the suspicious data identification system 130 may detect a potential threat associated with the extraneous characteristics by analyzing the analytics log associated with the extraneous characteristics. For instance, and by way of non-limiting example, the suspicious data identification system 130 may detect a potential threat in response to the behavioral analysis of an extraneous characteristic showing the extraneous characteristic was of file type associated with one or more known threats. In another instance, and by way of non-limiting example, the suspicious data identification system 130 may detect a potential threat in response to the sender's location being within a location associated with one or more known threats.

As shown in block 404, the process flow 400 of this embodiment includes determining a behavior pattern associated with at least one of a sender or a designated receiver of the electronic communication. In some embodiments, the suspicious data identification system 130 may determine the behavior pattern in a processor (e.g., processor 102 in FIGS. 1A-1C). In some embodiments, the suspicious data identification system 130 may store the determined behavior pattern in a storage device (e.g., memory 104 or storage device 106 in FIGS. 1A-1C). As used herein, a "sender" may include an external user device, an external entity, an external end-point device (e.g., end-point device(s) 140 in FIGS. 1A-1C), and/or the like that has the ability to send electronic communications.

In some embodiments, determining a behavior pattern may include determining normal behavior for the at least one sender or designated receiver of the electronic communication. For instance, and by way of non-limiting example, the suspicious data identification system 130 may determine one or more baseline activities the at least one sender or designated receiver performs. In this way, the suspicious data identification system 130 may compare activities of the at least one sender or designated receiver with the one or more baseline activities.

As shown in block 406, the process flow 400 of this embodiment includes tracking activities associated with at least one of the sender or the designated receiver of the electronic communication. In some embodiments, the suspicious data identification system 130 may track activities in a processor (e.g., processor 102 in FIGS. 1A-1C). In some embodiments, the suspicious data identification system 130 may store all user activities in a storage device (e.g., memory 104 or storage device 106). As used herein, "tracking" may include monitoring, observing, examining, surveilling, and/or the like.

In some embodiments, tracking activities may include tracking activities associated with the electronic communication. In some embodiments, tracking activities may include tracking activities unrelated to the electronic communication. For instance, and by way of non-limiting example, the suspicious data identification system 130 may track activities of a sender after transmission of the electronic communication.

In some embodiments, the suspicious data identification system 130 may track activities associated with an internal device. In some embodiments, the suspicious data identification system 130 may track activities associated with an external device. In some embodiments, the suspicious data identification system 130 may track activities associated with a device which transmits electronic communications to an internal device.

As shown in block 408, the process flow 400 of this embodiment includes determining intent associated with the sender or the electronic communication. In some embodiments, determining the intent of the sender may include analyzing historical electronic communications the sender may have sent to the suspicious data identification system 130. In some embodiments, the historical electronic communications may include any electronic communications the sender has sent in the past. For instance, and by way of non-limiting example, the suspicious data identification system 130 may determine the intent of the sender in response to analyzing electronic communications the sender has sent in the past.

In some embodiments, determining the intent of the sender may include analyzing present electronic communications the sender may have sent to the suspicious data identification system 130. In some embodiments, the present electronic communications may include the electronic communications the suspicious data identification system 130 is analyzing. For instance, and by way of non-limiting example, the suspicious data identification system 130 may receive an electronic communication from a sender and determine the intent of the sender in response to the present electronic communications.

In some embodiments, determining the intent of the sender may include comparing the historical and present electronic communications the sender may have sent to the suspicious data identification system 130. In some embodiments, the suspicious data identification system 130 may determine that the sender is a potential sender threat. In some embodiments, the suspicious data identification system 130 may determine the sender is a potential sender threat in response to determining the intent of the sender. For instance, and by way of non-limiting example, the suspicious data identification system 130 may determine the sender is a potential sender threat in response to determining the intent of the sender is to attempt to install malware.

In some embodiments, the suspicious data identification system 130, in response to determining that the sender is a potential sender threat, may automatically block electronic communications originating from the sender. In some embodiments, the suspicious data identification system 130, in response to determining that the sender is a potential sender threat, generate an alert interface component. In some embodiments, the suspicious data identification system 130 may transmit the alert interface component to a manager of the suspicious data identification system 130, a user, the designated receiver, a third-party device, a security entity, and/or the like.

FIG. 5 is a flow chart 500 which illustrates updating the one or more improvement instances to the underperforming function. The method may be carried out by various components of the distributed computing environment 100 discussed herein (e.g., the system 130, one or more end-point devices 140, etc.). An example system may include at least one processing device and at least one non-transitory storage device with computer-readable program code stored thereon and accessible by the at least one processing device, wherein the computer-readable code when executed is configured to carry out the method discussed herein.

In some embodiments, a suspicious data identification system (e.g., similar to one or more of the systems described herein with respect to FIGS. 1A-1C) may perform one or more of the steps of process flow 500. For example, a suspicious data identification system (e.g., the system 130 described herein with respect to FIGS. 1A-1C) may perform the steps of process flow 500.

As shown in block 502, process flow 500 of this embodiment includes determining an underperforming function, wherein the underperforming function is a function that allows one or more potential threats to pass to an end user. In some embodiments, the underperforming function may be one or more of the behavioral analysis, the static analysis, the metadata analysis, the malware detection pattern, or the malware detection tool. In some embodiments, a function (e.g., behavioral analysis, static analysis, metadata analysis, malware detection pattern, and/or malware detection tool, and/or the like) may be determined to be an underperforming function if it allows a predetermined number of potential threats to pass to the end user. In some embodiments, the predetermined number of potential threats may be determined (e.g., pre-determined) by a manager of the suspicious data identification system 130. In some embodiments, the predetermined number of potential threats may be determined by the suspicious data identification system 130. In some embodiments, the predetermined number of potential threats may be determined by a security entity associated with the entity to which the electronic communication was sent.

As shown in block 504, process flow 500 of this embodiment includes searching the analytics log for one or more improvement instances, wherein the one or more improvement instances comprise collected data which improves the functionality of the underperforming function by adjusting one or more parameters of the underperforming function to reduce an amount of potential threats that pass to an end user. In some embodiments, the one or more improvement instances includes data that may be used to adjust (e.g., re-train) the suspicious data identification system 130. In some embodiments, the improvement instances may be used to adjust (e.g., re-train) the behavioral analysis, the static analysis, or the metadata analysis. In some embodiments, the improvement instances may be used to adjust the malware detection patterns or the malware detection tools.

In some embodiments, adjusting one or more parameters of the underperforming function may include adjusting (e.g., reconfiguring) parameters associated with the underperforming function. In some embodiments, the suspicious data identification system 130 may adjust (e.g., reconfigure) the one or more parameters of the underperforming function. In some embodiments, the manager of the suspicious data identification system 130 may adjust the one or more parameters of the underperforming function.

In some embodiments, the one or more parameters that may be adjusted may include any known malware origins in response to the malware detection tool being an underperforming function. For instance, and by way of non-limiting example, in response to the malware detection tool being an underperforming function, the known malware origins may be reconfigured as malware attacks evolve and update. Similarly, and by way of non-limiting example, in response to the malware detection pattern being an underperforming function, the one or more parameters that may be adjusted may include the malware family identification. In this way, the amount of potential threats that reach the end user may be reduced by adjusting the malware detection pattern (e.g., YARA rules) which may allow the suspicious data identification system 130 to detect potential threats to the system.

In some embodiments, the one or more parameters that may be adjusted may include updating the class of confidential data. For instance, and by way of non-limiting example, the suspicious data identification system 130 may update the class of confidential data in response to hidden data being exfiltrated (e.g., copied, transferred, exported, and/or the like) without authorization. In some embodiments, the class of confidential data that may be updated may include a type of file, the text of a file, a particular word, and/or the like.

As shown in block 506, process flow 500 of this embodiment includes updating the one or more improvement instances to the underperforming function. In some embodiments, updating the one or more improvement instances to the underperforming function may include basing the adjustment (e.g., reconfiguration) of one or more parameters of the underperforming function on the improvement instances. For instance, and by way of non-limiting example, the parameters of the underperforming function may be adjusted in response to a particular improvement instance. In some embodiments, the suspicious data identification system 130 may adjust (e.g., reconfigure) one or more parameters of the underperforming function in response to the improvement instance. In some embodiments, the manager of the suspicious data identification system 130 may adjust one or more parameters of the underperforming function in response to the improvement instance.

FIG. 6 is a flow chart 600 which illustrates, in response to the hidden data being within the class of confidential data, blocking the transmission of the outgoing electronic communication. The method may be carried out by various components of the distributed computing environment 100 discussed herein (e.g., the system 130, one or more end-point devices 140, etc.). An example system may include at least one processing device and at least one non-transitory storage device with computer-readable program code stored thereon and accessible by the at least one processing device, wherein the computer-readable code when executed is configured to carry out the method discussed herein.

In some embodiments, a suspicious data identification system (e.g., similar to one or more of the systems described herein with respect to FIGS. 1A-1C) may perform one or more of the steps of process flow 600. For example, a suspicious data identification system (e.g., the system 130 described herein with respect to FIGS. 1A-1C) may perform the steps of process flow 600.

As shown in block 602, process flow 600 of this embodiment includes receiving a transmission of an outgoing electronic communication, wherein the outgoing electronic communication contains one or more extraneous characteristics. In some embodiments, the outgoing electronic communication may include an outgoing electronic communication which originates from within the entity associated with the suspicious data identification system 130. In some embodiments, the suspicious data identification system 130 may analyze the outgoing electronic communication to determine whether the outgoing electronic communication contains one or more extraneous characteristics.

As shown in block 604, process flow 600 of this embodiment includes, in response to the outgoing electronic communication containing extraneous characteristics, determining whether the extraneous characteristics contain one or more pieces of hidden data. In some embodiments, the suspicious data identification system 130 may analyze the extraneous characteristics to determine whether the extraneous characteristics contain one or more pieces of hidden data.

As used herein, "hidden data" may include any data that is attempting to be exfiltrated (e.g., copied, transferred, exported, and/or the like) without authorization. In some embodiments, the hidden data may be contained within any file type (e.g., text document, video, picture, executable file, hyperlink, and/or the like). In some embodiments, the suspicious data identification system 130 may determine whether the extraneous characteristics contain one or more pieces of hidden data by a processor (e.g., processor 102 in FIGS. 1A-1C).

As shown in block 606, process flow 600 of this embodiment includes, in response to the extraneous characteristics containing one or more pieces of hidden data, determining whether the hidden data is in a class of confidential data. In some embodiments, the class of confidential data may be a predetermined category (e.g., list, record, ledger, and/or the like) of confidential data. In some embodiments, the class of confidential data may be predetermined by the manager of the suspicious data identification system 130. In some embodiments the class of confidential data may be predetermined by an entity associated with the suspicious data identification system 130.

For instance, and by way of non-limiting example, a class of confidential data may be associated with a particular file type. In this way, the suspicious data identification system 130 may determine that an outgoing electronic communication containing an extraneous characteristic of the file type within the class of confidential data may contain hidden data.

In another instance, and by way of non-limiting example, a class of confidential data may be associated with a particular text string (e.g., group of characters, words, numbers, special characters, and/or the like). In this way, the suspicious data identification system 130 may determine that an outgoing electronic communication is hidden data in response to the electronic communication containing the particular text string.

In some embodiments, the suspicious data identification system 130 may compare the hidden data within an extraneous characteristic with the class of confidential data. In some embodiments, the comparison may include a match percentage threshold. In some embodiments, the match percentage threshold may be predetermined by a manager associated with the suspicious data identification system 130. As used herein, the match percentage threshold may measure how close the hidden data matches a piece of confidential data within the class of confidential data. For instance, and by way of non-limiting example, in response to the hidden data being a text string, the suspicious data identification system 130 may determine the electronic communication contains hidden data based on the comparison of the hidden data and the confidential data falling within the match percentage threshold.

In some embodiments, the suspicious data identification system 130 may generate a confidential alert interface component in response to the extraneous characteristics containing one or more pieces of hidden data. In some embodiments, the suspicious data identification system 130 may transmit the confidential alert interface component to the manager associated with the suspicious data identification system 130. In some embodiments, the suspicious data identification system 130 may transmit the confidential alert interface component to a third-party user device.

As shown in block 608, process flow 600 of this embodiment includes, in response to the hidden data being within the class of confidential data, blocking the transmission of the outgoing electronic communication. In some embodiments, the suspicious data identification system 130 may block the transmission of the outgoing electronic communication in a processor (e.g., processor 102 in FIGS. 1A-1C). In some embodiments, the suspicious data identification system 130 may block the transmission of the outgoing electronic communication automatically. In some embodiments, the suspicious data identification system 130 may wait for an input to block the transmission of the outgoing electronic communication. In some embodiments, the input may originate from a user, a manager of the suspicious data identification system 130, a manager of the entity, and/or the like.

FIG. 7 is a flow chart 700 which illustrates a non-limiting example process flow of the suspicious data identification system. The method may be carried out by various components of the distributed computing environment 100 discussed herein (e.g., the system 130, one or more end-point devices 140, etc.). An example system may include at least one processing device and at least one non-transitory storage device with computer-readable program code stored thereon and accessible by the at least one processing device, wherein the computer-readable code when executed is configured to carry out the method discussed herein.

In some embodiments, a suspicious data identification system (e.g., similar to one or more of the systems described herein with respect to FIGS. 1A-1C) may perform one or more of the steps of process flow 700. For example, a suspicious data identification system (e.g., the system 130 described herein with respect to FIGS. 1A-1C) may perform the steps of process flow 700.

As shown in block 702 of process flow 700, the suspicious data identification system 130 may receive an electronic communication containing one or more extraneous characteristics. For instance, and by way of non-limiting example, the electronic communication may contain one or more extraneous characteristics that contain an image.

As show in block 704 of process flow 700, the suspicious data identification system 130 may initiate a behavioral analysis on the electronic communication containing the one or more extraneous characteristics. For instance, and by way of non-limiting example, the suspicious data identification system 130 may initiate a behavioral analysis on an image (e.g., extraneous characteristics) contained within the electronic communication.

As show in block 706 of process flow 700, the suspicious data identification system 130 may create an isolated environment. In some embodiments, the suspicious data identification system 130 may place the electronic communication containing the extraneous characteristics in the isolated environment. For instance, and by way of non-limiting example, the suspicious data identification system 130 may create an isolated environment and place the image (e.g., extraneous characteristic) in the isolated environment.

As shown in block 708 of process flow 700, the suspicious data identification system 130 may initiate a metadata analysis on the electronic communication containing the one or more extraneous characteristics. For instance, and by way of non-limiting example, the suspicious data identification system 130 may initiate a metadata analysis on the image (e.g., extraneous characteristic). In this way, the suspicious data identification system 130 may examine how the isolated environment responds to the image (e.g., extraneous characteristic) being executed (e.g., opened, ran, save, and/or the like) within the isolated environment.

As shown in block 710 of process flow 700, the suspicious data identification system 130 may initiate a static analysis on the electronic communication containing the one or more extraneous characteristics. For instance, and by way of non-limiting example, the suspicious data identification system 130 may initiate a static analysis on the image (e.g., extraneous characteristic). In this way, the suspicious data identification system 130 may examine the results of the static analysis of the image (e.g., extraneous characteristic).

As shown in block 712 of process flow 700, the suspicious data identification system 130 may determine the results of the static analysis, the metadata analysis, and the behavioral analysis initiated on the electronic communication containing the one or more extraneous characteristics. For instance, the suspicious data identification system 130 may determine that the image (e.g., extraneous characteristic) is a potential threat in response to how the isolated environment responded to the image (e.g., extraneous characteristic) being executed within the isolated environment.

As shown in block 714 of process flow 700, the suspicious data identification system 130 may create an analytics log of the analysis results. For instance, and by way of non-limiting example, the suspicious data identification system 130 may create an analytics log in response to the image (e.g., extraneous characteristic) being a potential threat.

As shown in block 716 of process flow 700, the suspicious data identification system 130 may update an underperforming function. For instance, and by way of non-limiting example, the suspicious data identification system 130 may determine that the image (e.g., extraneous characteristic) was not determined to be a potential threat by either the static analysis, metadata analysis, and/or behavioral analysis. In this way, the suspicious data identification system 130 may analyze the analytics log for an improvement instance and update the underperforming function.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for identification and analysis of suspicious data in an electronic network environment, the system comprising:

at least one processing device; and at least one non-transitory storage device with computer-readable program code stored thereon and accessible by the at least one processing device, wherein the computer-readable code when executed is configured to cause the at least one processing device to:

receive a transmission of an electronic communication through a communication gateway;

determine the electronic communication contains one or more extraneous characteristics;

in response to determining that the electronic communication contains one or more extraneous characteristics, initiate at least one of a behavioral analysis, a static analysis, or a metadata analysis;

initiate the metadata analysis of the electronic communication;

cause the results of the metadata analysis to be stored in the analytics log;

cause at least one or more of the extraneous characteristics of the electronic communication to be placed in an isolated environment;

initiate an execution of the one or more extraneous characteristics in the electronic communication within the isolated environment;

cause the behavioral analysis of the electronic communication;

in response to initiating at least one of the behavioral analysis, the static analysis, or the metadata analysis, create an analytics log associated with the electronic communication cause the behavioral analysis to be stored in the analytics log;

in response to the behavioral analysis being stored in the analytics log, cause the isolated environment to be dismantled;

receive a transmission of an outgoing electronic communication, wherein the outgoing electronic communication contains one or more extraneous characteristics;

in response to the outgoing electronic communication containing extraneous characteristics, determine whether the extraneous characteristics contain one or more pieces of hidden data;

in response to the extraneous characteristics containing one or more pieces of hidden data, determine whether the hidden data is in a class of confidential data; and in response to the hidden data being within the class of confidential data, block the transmission of the outgoing electronic communication.

2. The system of claim 1, wherein the computer-readable code when executed is further configured to cause the at least one processing device to perform the metadata analysis, which comprises one or more of:

detect a potential threat associated with the electronic communication;

determine a behavior pattern associated with at least one of a sender or a designated receiver of the electronic communication;

track activities associated with at least one of the sender or the designated receiver of the electronic communication; or determine intent associated with the sender or the electronic communication.

3. The system of claim 1, wherein the computer-readable code when executed is further configured to cause the at least one processing device to cause a transmission of the analytics log to a user device.

4. The system of claim 3, wherein the user device comprises a user account associated with a user of the electronic communication.

5. The system of claim 4, wherein the user device is associated with a security entity, and wherein the security entity is associated with an entity where the user maintains the user account.

6. The system of claim 1, wherein the static analysis of the extraneous characteristics comprises following one or more malware detection patterns.

7. The system of claim 1, wherein the static analysis of the extraneous characteristics comprises implementing one or more malware detection tools.

8. The system of claim 1, wherein the computer-readable code when executed is further configured to cause the at least one processing device to cause an application upgrade, where the application upgrade comprises:

determine an underperforming function, wherein the underperforming function is a function that allows one or more potential threats to pass to an end user;

search the analytics log for one or more improvement instances, wherein the one or more improvement instances comprise collected data which improves the functionality of the underperforming function by adjusting one or more parameters of the underperforming function to reduce an amount of potential threats that pass to an end user; and update the one or more improvement instances to the underperforming function.

9. The system of claim 8, wherein the underperforming function is one or more of the behavioral analysis, the static analysis, the metadata analysis, the malware detection pattern, or the malware detection tool.

10. A computer program product for identification and analysis of suspicious data in an electronic network environment, the computer program product comprising at least one non-transitory computer-readable medium having computer-readable program code portions embodied therein, the computer-readable program code portions comprising:

an executable portion configured to receive a transmission of an electronic communication through a communication gateway;

an executable portion configured to determine the electronic communication contains one or more extraneous characteristics;

an executable portion configured to, in response to determining that the electronic communication contains one or more extraneous characteristics, initiate at least one of a behavioral analysis, a static analysis, or a metadata analysis;

initiate the metadata analysis of the electronic communication;

cause the results of the metadata analysis to be stored in the analytics log;

cause at least one or more of the extraneous characteristics of the electronic communication to be placed in an isolated environment;

initiate an execution of the one or more extraneous characteristics in the electronic communication within the isolated environment;

cause the behavioral analysis of the electronic communication;

an executable portion configured to, in response to initiating at least one of the behavioral analysis, the static analysis, or the metadata analysis, create an analytics log associated with the electronic communication cause the behavioral analysis to be stored in the analytics log; and in response to the behavioral analysis being stored in the analytics log, cause the isolated environment to be dismantled;

receive a transmission of an outgoing electronic communication, wherein the outgoing electronic communication contains one or more extraneous characteristics;

in response to the outgoing electronic communication containing extraneous characteristics, determine whether the extraneous characteristics contain one or more pieces of hidden data;

in response to the extraneous characteristics containing one or more pieces of hidden data, determine whether the hidden data is in a class of confidential data; and in response to the hidden data being within the class of confidential data, block the transmission of the outgoing electronic communication.

11. The computer program product of claim 10, wherein the computer program product further comprises an executable portion configured to perform the metadata analysis, which comprises one or more of:

detect a potential threat associated with the electronic communication;

determine a behavior pattern associated with at least one of a sender or a designated receiver of the electronic communication;

track activities associated with at least one of the sender or the designated receiver of the electronic communication; or determine intent associated with the sender or the electronic communication.

12. A computer-implemented method for identification and analysis of suspicious data in an electronic network environment, the computer-implemented method comprising:

receiving a transmission of an electronic communication through a communication gateway;

determining the electronic communication contains one or more extraneous characteristics;
in response to determining that the electronic communication contains one or more extraneous characteristics, initiating at least one of a behavioral analysis, a static analysis, or a metadata analysis;
initiating the metadata analysis of the electronic communication;
causing the results of the metadata analysis to be stored in the analytics log;
causing at least one or more of the extraneous characteristics of the electronic communication to be placed in an isolated environment;
initiating an execution of the one or more extraneous characteristics in the electronic communication within the isolated environment;
causing the behavioral analysis of the electronic communication;
in response to initiating at least one of the behavioral analysis, the static analysis, or the metadata analysis, creating an analytics log associated with the electronic communication;
causing the behavioral analysis to be stored in the analytics log; and
in response to the behavioral analysis being stored in the analytics log, causing the isolated environment to be dismantled;
receiving a transmission of an outgoing electronic communication, wherein the outgoing electronic communication contains one or more extraneous characteristics;
in response to the outgoing electronic communication containing extraneous characteristics, determining whether the extraneous characteristics contain one or more pieces of hidden data;
in response to the extraneous characteristics containing one or more pieces of hidden data, determining whether the hidden data is in a class of confidential data; and
in response to the hidden data being within the class of confidential data, blocking the transmission of the outgoing electronic communication.

13. The computer-implemented method of claim 12, further comprising performing the metadata analysis, which comprises one or more of:
detecting a potential threat associated with the electronic communication;
determining a behavior pattern associated with at least one of a sender or a designated receiver of the electronic communication;
tracking activities associated with at least one of the sender or the designated receiver of the electronic communication; or
determining intent associated with the sender or the electronic communication.

14. The computer program product of claim 10, wherein the computer program product further comprises an executable portion configured to cause an application upgrade, where the application upgrade comprises:
determine an underperforming function, wherein the underperforming function is a function that allows one or more potential threats to pass to an end user;
search the analytics log for one or more improvement instances, wherein the one or more improvement instances comprise collected data which improves the functionality of the underperforming function by adjusting one or more parameters of the underperforming function to reduce an amount of potential threats that pass to an end user; and
update the one or more improvement instances to the underperforming function.

15. The computer program product of claim 10, wherein the underperforming function is one or more of the behavioral analysis, the static analysis, the metadata analysis, the malware detection pattern, or the malware detection tool.

16. The computer-implemented method of claim 12, further comprising causing an application upgrade, where the application upgrade comprises:
determining an underperforming function, wherein the underperforming function is a function that allows one or more potential threats to pass to an end user;
searching the analytics log for one or more improvement instances, wherein the one or more improvement instances comprise collected data which improves the functionality of the underperforming function by adjusting one or more parameters of the underperforming function to reduce an amount of potential threats that pass to an end user; and
updating the one or more improvement instances to the underperforming function.

17. The computer-implemented method of claim 12, wherein the underperforming function is one or more of the behavioral analysis, the static analysis, the metadata analysis, the malware detection pattern, or the malware detection tool.

* * * * *